United States Patent
Paluszek et al.

(10) Patent No.: US 10,241,191 B2
(45) Date of Patent: Mar. 26, 2019

(54) MULTI-SENSOR TARGET TRACKING USING MULTIPLE HYPOTHESIS TESTING

(71) Applicant: PRINCETON SATELLITE SYSTEMS, INC., Plainsboro, NJ (US)

(72) Inventors: Michael A. Paluszek, Princeton, NJ (US); Joseph Mueller, Champlin, MN (US); Stephanie Thomas, West Windsor, NJ (US)

(73) Assignee: PRINCETON SATELLITE SYSTEMS, INC., Plainsboro, NJ (US)

( * ) Notice: Subject to any disclaimer, the term of this patent is extended or adjusted under 35 U.S.C. 154(b) by 348 days.

(21) Appl. No.: 14/835,094

(22) Filed: Aug. 25, 2015

(65) Prior Publication Data
US 2016/0054430 A1 Feb. 25, 2016

Related U.S. Application Data

(60) Provisional application No. 62/041,454, filed on Aug. 25, 2014.

(51) Int. Cl.
| | | |
|---|---|---|
| G01S 5/02 | (2010.01) | |
| G01S 5/18 | (2006.01) | |
| G01S 5/16 | (2006.01) | |
| G01S 11/12 | (2006.01) | |
| G01S 15/66 | (2006.01) | |
| G01S 15/93 | (2006.01) | |
| G01S 13/93 | (2006.01) | |
| G01S 13/72 | (2006.01) | |

(52) U.S. Cl.
CPC .............. *G01S 5/0294* (2013.01); *G01S 5/16* (2013.01); *G01S 5/18* (2013.01); *G01S 11/12* (2013.01); *G01S 13/726* (2013.01); *G01S 13/931* (2013.01); *G01S 15/66* (2013.01); *G01S 15/931* (2013.01)

(58) Field of Classification Search
CPC . G01S 5/0294; G01S 5/16; G01S 5/18; G01S 11/12; G01S 13/726
See application file for complete search history.

(56) References Cited

U.S. PATENT DOCUMENTS

| | | | | |
|---|---|---|---|---|
| 9,612,316 B1 * | 4/2017 | Griesmeyer | ............ | G01S 5/0294 |
| 2013/0091503 A1 * | 4/2013 | Painsky | ................ | G06F 9/5083 |
| | | | | 718/100 |
| 2014/0324339 A1 * | 10/2014 | Adam | ................... | G01S 13/726 |
| | | | | 701/519 |

* cited by examiner

*Primary Examiner* — Tri M Hoang
(74) *Attorney, Agent, or Firm* — Volpe and Koenig, P.C.

(57) ABSTRACT

Disclosed a multi-sensor multiple hypotheses testing tracking system. The multi-hypothesis testing system associates measurements from multiple sensors with tracks. Measurements are incorporated using a Kalman Filter and the same filters are used to propagate the trajectories of the tracks.

10 Claims, 4 Drawing Sheets

MULTI-SENSOR TARGET TRACKING USING MULTIPLE HYPOTHESIS TESTING

CROSS-REFERENCE TO RELATED APPLICATIONS

This applications claims priority to U.S. Provisional Patent Application No. 62/041,454, filed Aug. 25, 2014, the disclosure of which is incorporated herein by reference.

GOVERNMENT RIGHTS IN INVENTION

This invention was made with government support under contract FA9453-11-C-0163 awarded by the United States Air Force. The government has certain rights in this invention.

FIELD OF THE INVENTION

The present invention relates to the tracking of multiple targets.

BACKGROUND OF THE INVENTION

Ding, et. al, U.S. Pat. No. 7,626,535, Dec. 1, 2009, "Track Quality Based Multi-Target Tracker," discloses a track based multi-target tracking system. Their method does not allow for multiple sensors and provides not mechanism for multiple sensors. This application improves on their patent by providing a rigorous method for using multiple sensors and a more robust tracking algorithm.

Carson, et. al, U.S. Pat. No. 5,379,044, Jan. 3, 1995, "Efficient Multi-Target Tracking System," cannot be adapted to multiple sensors. In addition, this application improves on its processing method by using integer programming which is far more efficient than the disclosed algorithm.

Miller, U.S. Pat. No. 4,072,943, Feb. 7, 1978, "Multi-Target Tracking" provides no mechanism for associating measurements with multiple targets nor can it be added to the disclosed system.

The cited patents for tracking targets do not solve the fundamental problem of assigning multiple measurements to multiple objects when the objects are observed by multiple sensors.

SUMMARY OF THE INVENTION

The present invention provides a multiple sensor target tracking system.

SUMMARY OF THE INVENTION

The present invention provides a multiple sensor target tracking system. The invention pertains to using track oriented multiple hypothesis testing with multiple sensors.

Track oriented multiple hypothesis testing ("MHT") is a powerful technique for assigning measurements to tracks of objects when the number of objects is unknown or changing. It is absolutely essential for accurate tracking of multiple objects.

Tracking is based on the formulation of hypotheses. Hypotheses are sets of tracks with consistent data, that is, where no measurements are assigned to more than one track. The track-oriented approach recomputes the hypotheses using the newly updated tracks after each scan of data is received. Rather than maintaining, and expanding, hypotheses from scan to scan, the track-oriented approach discards the hypotheses formed on scan k−1. The tracks that survive pruning are propagated to the next scan k where new tracks are formed, using the new observations, and reformed into hypotheses. Except for the necessity to delete some tracks based upon low probability, no information is lost because the track scores, that are maintained, contain all the relevant statistical data.

Hypotheses are sets of tracks with consistent data, that is, where no measurements are assigned to more than one track. The track-oriented approach recomputes the hypotheses using the newly updated tracks after each scan of data is received. Rather than maintaining, and expanding, hypotheses from scan to scan, the track-oriented approach discards the hypotheses formed on scan k−1. The tracks that survive pruning are propagated to the next scan k where new tracks are formed, using the new observations, and reformed into hypotheses. Except for the necessity to delete some tracks based upon low probability, no information is lost because the track scores, that are maintained, contain all the relevant statistical data.

DETAILED DESCRIPTION

Estimating the position of multiple targets with one or more sensor requires assignment measurements to tracks.

In this disclosure a "measurement" is a single measurement taken from a single sensor during a scan. A measurement by itself does not yet imply any association with an object. A "scan" is a collection of measurements taken over one time interval. A scan can include measurements from multiple sensors. A "track" is a sequence of measurements across multiple scans that are associated with the same object. A track is defined as the unique path of a distinct object. In situations where there are a multiple objects, such as for a radar system in a car during rush hour traffic, it is necessary to associate measurements with objects. A "hypothesis" is set of compatible tracks.

Figure 1:
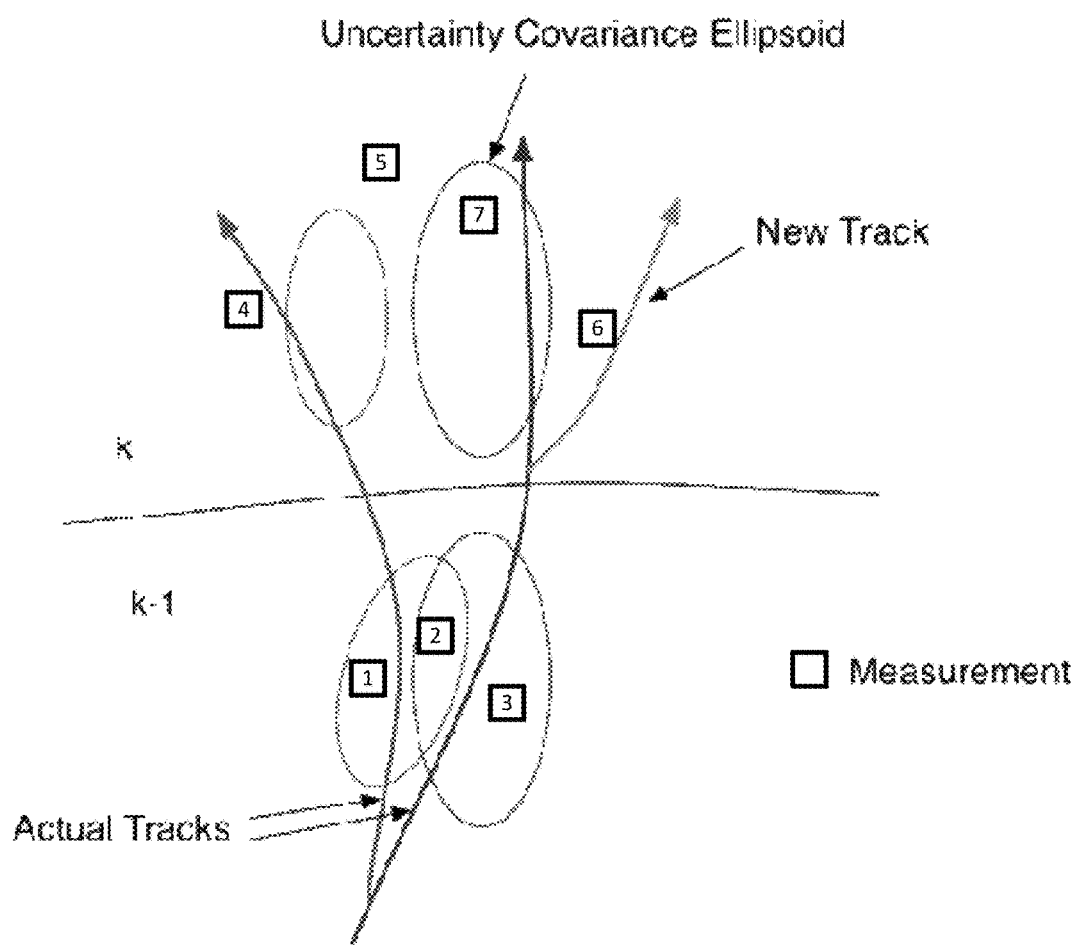
FIG. 1 shows a diagram of the sensing problem.

An embodiment of the tracking problem that is the subject of this invention is shown in FIG. 1. This diagram shows various elements of the tracking problem.

Figure 2:
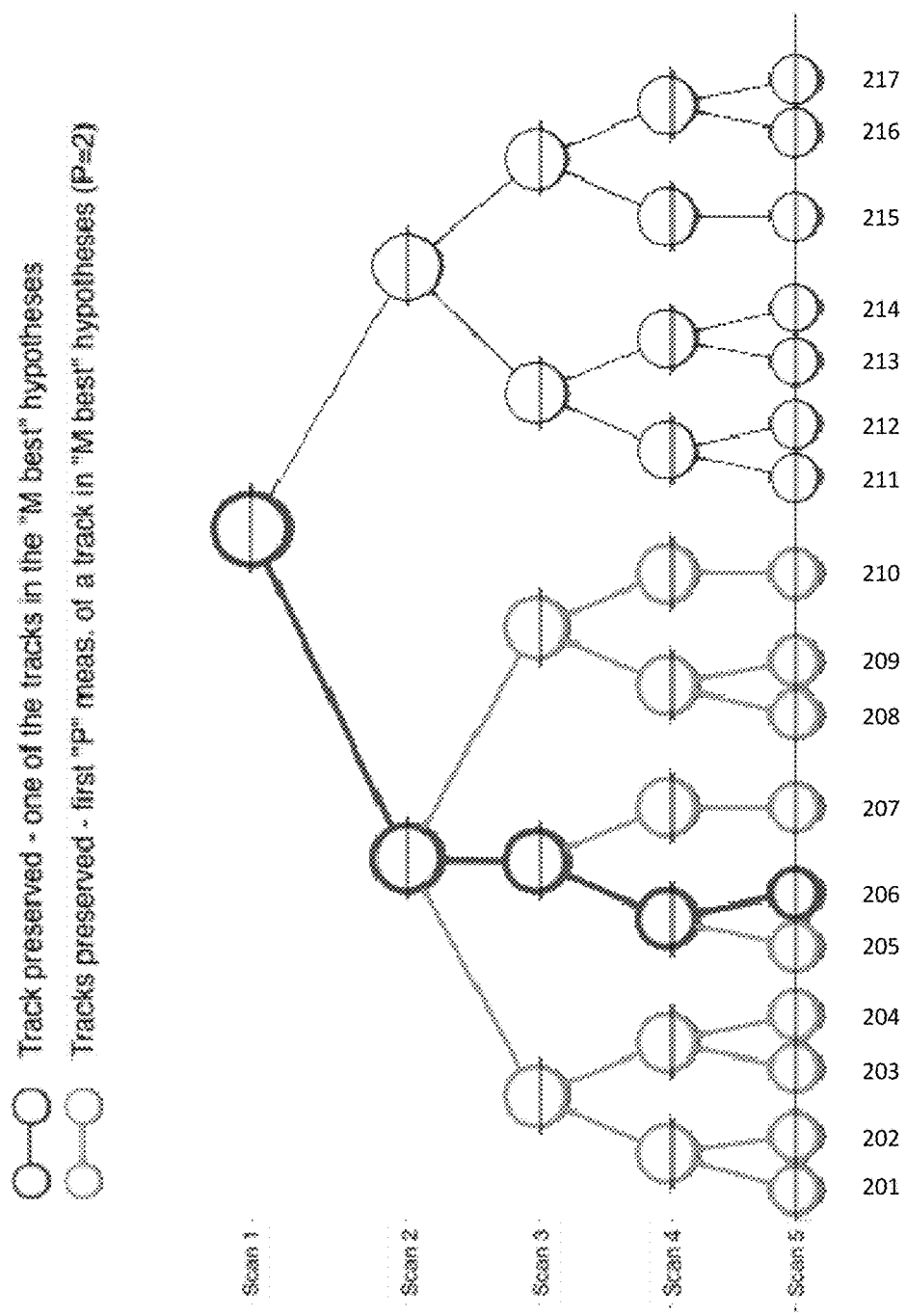
FIG. 2 shows a block diagram of the system.

A block diagram of the tracking system is shown in FIG. 2.

Before discussing the method of hypothesis formation, it is useful to first consider track formation and how tracks are associated with unique objects. New tracks may be formed in one of two ways. First, the new track is based on some existing track, with the addition of a new measurement. Second, the new track is not based on any existing tracks; rather, it is based solely on a single new measurement.

Each track is formed as a sequence of measurements across multiple scans. In addition to the raw measurement history, every track also contains a history of state and covariance data that is computed from a Kalman filter. As an example, consider the problem of determining the precise location of a truck. The truck can be equipped with a GPS unit that provides an estimate of the position within a few meters. The GPS measurement is likely to be noisy; readings "jump around" rapidly, though remaining within a few meters of the real position. In addition, since the truck is expected to follow the laws of physics, its position can also be estimated by integrating its velocity over time, determined by, for example, keeping track of wheel revolutions and the angle of the steering wheel. This is a technique known as dead reckoning. Typically, dead reckoning will provide a very smooth estimate of the truck's position, but it will drift over time as small errors accumulate.

In this example, the Kalman filter can be thought of as operating in two distinct phases: predict and update. In the prediction phase, the truck's old position will be modified according to the physical laws of motion (the dynamic or "state transition" model) plus any changes produced by the accelerator pedal and steering wheel. Not only will a new position estimate be calculated, but a new covariance will be calculated as well. For example, the covariance may be proportional to the speed of the truck because we are more uncertain about the accuracy of the dead reckoning position estimate at high speeds but very certain about the position estimate when moving slowly. Next, in the update phase, a measurement of the truck's position is taken from the GPS unit. Along with this measurement come some amount of uncertainty, and its covariance relative to that of the prediction from the previous phase determines how much the new measurement will affect the updated prediction. Ideally, if the dead reckoning estimates tend to drift away from the real position, the GPS measurement should pull the position estimate back towards the real position but not disturb it to the point of becoming rapidly changing and noisy.

When a new measurement is appended to an existing track, we are spawning a new track that includes all of the original track's measurements, plus this new measurement. Therefore, the new track is describing the same object as the original track.

A new measurement can also be used to generate a completely new track that is independent of past measurements. When this is done, we are effectively saying that the measurement does not describe any of the objects that are already being tracked. It therefore must correspond to a new and/or different object. In this way, each track is given an object ID to distinguish which object it describes. Within the context of track-tree diagrams, all of the tracks inside the same track-tree have the same object ID. For example, if at some point there are 10 separate track-trees, this means that 10 separate objects are being tracked in the multiple hypothesis testing ("MHT") system. When a valid hypothesis is formed, it may turn out that only a few of these objects have compatible tracks.

In MHT, a valid hypothesis is any compatible set of tracks. In order for two or more tracks to be compatible, they cannot describe the same object, and they cannot share the same measurement at any of the scans. The task in hypothesis formation is to find one or more combinations of tracks that: 1) are compatible, and 2) maximize some performance function.

The hypothesis formation step is formulated as an integer program (IP). Each track is given an aggregate score that reflects the component scores attained from each measurement. The IP formulation is constructed to select a set of compatible tracks that add to give the highest score.

Let $N_T$ be the total number of tracks currently being maintained, let $N_O$ be the number of different objects represented by those tracks, and let $N_S$ be the number of scans. Assuming measurements come from a single sensor, then for any given scan, each track can have either a) no measurement or b) a single measurement. Let the score of the measurement for track i at scan j be denoted as s(i,j). The total score for each track is then:

$$S(i) = \sum_{j=1}^{N_S} s(i \cdot j)$$

Each track is a collection of measurements that, together, represent the believed state evolution of one object. Therefore, each track has an associated object ID, T(i). Multiple tracks may share the same object ID. These are considered alternative tracks on the same track-tree. Each of these tracks represents a different sequence of measurements that could be used to describe the object. For two tracks to be compatible within a hypothesis, they must meet the following criteria:

Compatible tracks cannot have the same object ID.
Compatible tracks cannot share the same measurement.

At each scan j, a set of $N_M(j)$ measurements are taken. Each of these measurements is assigned a unique index. Let m(i,j) denote the measurement index for track i at scan j, where $m(i,j) \in \{1, 2, \ldots, N_M(j)\}$ Consider two tracks, i≠i.

For the two tracks to be compatible the object IDs must be different and the measurements at each scan must be different.

This can be written as follows:

$T(i) \neq T(i)$ $m(i,j) \neq m(i,j), \forall j=1, \ldots N_S$

Now, let x(i) be a binary decision variable, representing whether track i is selected or not. Also, let the set of tracks whose object ID is p be represented as O(p) The object ID constraints can be written as:

$$\sum_{i \in O_{(p)}} x(i) \leq 1,$$

$$\forall p = 1, \ldots, N_O$$

This says that there can be no more than one track with the object ID of p. Applying this constraint for the full list of object IDs ensures that each object is either a) not included in the hypothesis, or b) represented by one track.

Let R(j,k) represent the set of tracks that have measurement k at scan j.

The measurement index constraint can be rewritten as:

$\text{sum}_{i \in R(j,k)} x(i) \leq 1, \forall j=1, \ldots, N_S$ $\forall k=1, \ldots, N_M(j)$ We can now put the constraints and the objective function together to formulate the IP.

Maximize $$\sum_{i=1}^{N_T} S(i)x(i)$$

Subject to $$\sum_{i \in T(k)} x(i) \leq 1,$$

$\forall k$ $$\sum_{i \in R(j,k)} x(i) \le 1,$$

$$\forall j = 1, \dots N_S$$

$$\forall k = 1, \dots, N_M(j)$$

This formulation can also be extended to solve for multiple hypotheses, rather than just one.

In this case, the solution would provide the "M Best" hypotheses, in descending order of score. This enables tracks to be preserved from alternate hypotheses that may be very close in score to the best.

To solve for a second hypothesis, we introduce a new set of decision variables, y. This is similar to x but represents an alternative set of tracks to form an alternative hypothesis. The same objective function and constraints are applied to y. In addition, we apply a new constraint which forces the score of x to be higher than the score of y. This ensures that the two solutions are different.

$$\sum_{i=1}^{N_T} S(i)x(i) \ge \sum_{i=1}^{N_T} S(i)y(i) + \delta$$

where $\delta > 0$ is small number. This constraint must be applied to each pair of hypotheses.

The new IP formulation with two hypotheses becomes:

Maximize $$\sum_{i=1}^{N_T} S(i)x(i) + \sum_{i=1}^{N_T} S(i)y(i)$$

Subject to $$\sum_{i \in T(k)} x(i) \le 1,$$

$$\forall k$$

$$\sum_{i \in R(j,k)} x(i) \le 1,$$

$$\forall j = 1, \dots, N_S$$

$$\forall k = 1, \dots, N_M(j)$$

$$\sum_{i \in T(k)} y(i) \le 1,$$

$$\forall k$$

$$\sum_{i \in R(j,k)} y(i) \le 1,$$

$$\forall j = 1, \dots, N_S$$

$$\forall k = 1, \dots, N_M(j)$$

$$\sum_{i=1}^{N_T} S(i)x(i) \ge \sum_{i=1}^{N_T} S(i)y(i) + \delta$$

For M hypotheses, there are M sets of the original constraints, plus $M(M-1)/2$ new constraints for solution uniqueness. In general, there may not exist M valid hypotheses. Therefore, the problem can be formulated and solved for M=1 first, then M=2, and so on.

Previously we assumed that all measurements came from a single sensor. We now consider the case where measurements are obtained from multiple sensors.

There are some important differences in how track formation is carried out when multiple sensors are present.

With a single sensor, we can add a NULL measurement or a single real measurement at each scan. With multiple sensors, we can add a NULL measurement, a single real measurement, or multiple real measurements at each scan. If multiple measurements are added to a track for a single scan, they must all come from different sensors.

With a single sensor, if multiple measurements in one scan were within the gate of a track, each spawned a new track with that measurement appended. Now considering multiple sensors, we must check the sensor ID of all the measurements in the gate of a track. If these measurements are from different sensors, then they can all be appended to the same track. However, if any sensor has multiple measurements that are in the gate of a track, then new tracks must be spawned for each of these different combinations of measurements.

As before, let $N_T$ be the total number of tracks currently being maintained, let $N_O$ be the number of different objects represented by those tracks, and let $N_S$ be the number of scans.

The track score is still defined according as shown above.

Now let $N_Q \ge 1$ be the number of sensors. Then for any given scan, each track can have either a) no measurement or b) as many as $N_Q$ measurements.

The following criteria must be met for two tracks to be compatible. First, compatible tracks cannot have the same object ID. Second, compatible tracks cannot share the same measurement from the same sensor. Third, the object ID constraints remain the same.

Previously, we defined R(j,k) as the set of tracks that have measurement $k$ at scan j. We now introduce multiple sensors. Let R*(j,k,q) be the set of tracks that have measurement k from sensor q at scan j.

The measurement index constraint can now be written as:

$$\sum_{i \in R*(j,k,q)} x(i) \le 1,$$

$$\forall j = 1, \dots, N_S$$

$$\forall k = 1, \dots, N_M(j)$$

$$\forall q = 1, \dots, N_Q$$

The contents of the set R* for each (j,k,q) triple are a set of incompatible tracks.

Track pruning is carried out on an intermittent basis. Nominally, a set frequency can be used throughout the process—for example, prune tracks once every 5 scans. Another option is to conduct the pruning step when the number of tracks exceeds a set threshold. In any case, the purpose of track pruning is to delete the tracks that we think are wrong, and keep only those that we think may be correct.

We employ a pruning method in which the following tracks are preserved:

Tracks with the "N" highest scores
Tracks that are included in the "M best" hypotheses
Tracks that have both 1) the object ID and 2) the first "P" measurements found in the "M best" hypotheses.

We use the results of hypothesis formation to guide track pruning. The parameters N, M, P can be tuned to improve performance. The objective with pruning is to reduce the number of tracks as much as possible, while not removing any tracks that should be part of the actual true hypothesis.

The second item listed above is to preserve all tracks included in the "M best" hypotheses. Each of these is a full path through a track-tree, which is clear. The third item listed above is similar, but less constrained. Consider one of the tracks in the "M best" hypotheses. We will preserve this full track. In addition, we will preserve all tracks that stem from scan "P" of this track.

FIG. 2 provides an example of which tracks in a track-tree might be preserved. The diagram shows 17 different tracks (tracks 201-217) over 5 scans (Scan 1-Scan 5). The dark line track (206) represents one of the tracks found in the set of "M best" hypotheses, from the hypothesis formation step. This track would be preserved. The light line tracks (201, 202, 203, 204, 205, 207, 208, 209, 210) all stem from the node in this track at scan 2. These tracks will be preserved if P=2 is set as described above. In this circumstance, for example, tracks 211-217 will be pruned.

Figure 3:
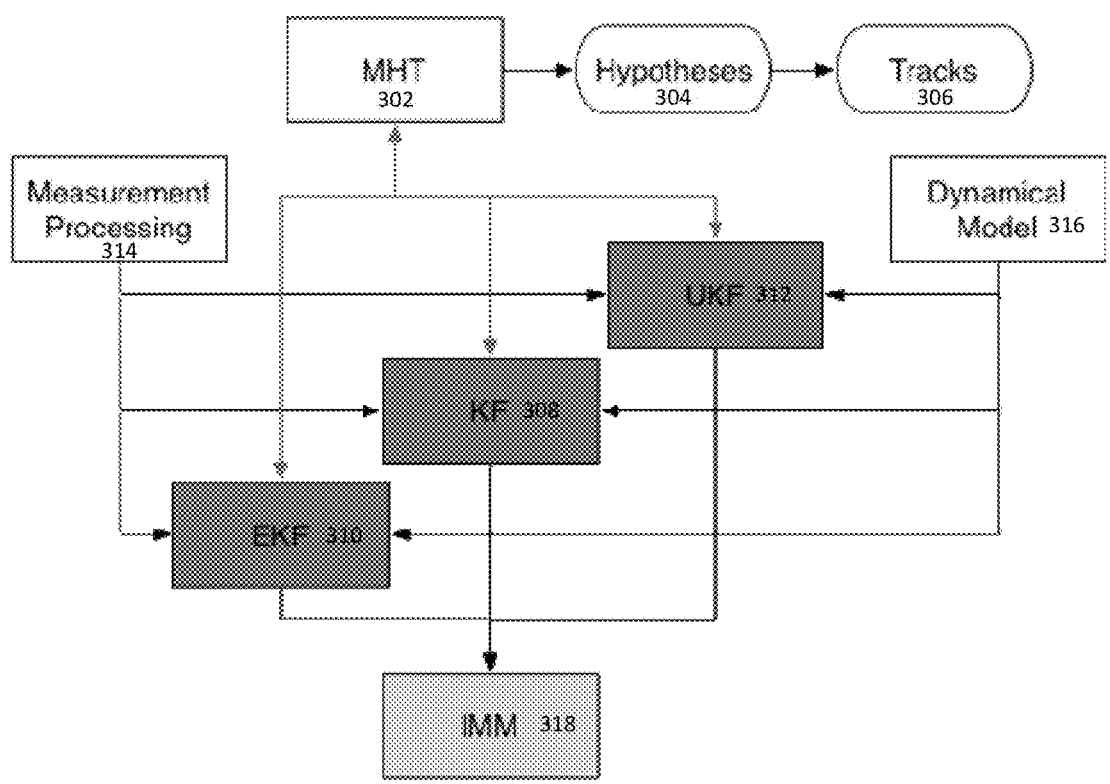
FIG. 3 shows a decision tree.

A input model is shown in FIG. 3. The figure shows how the tracks are preserved over multiple scans of measurements. The MHT 302 receives inputs from one or more of Kalman filter 308, extended Kalman filter 310, and unscented Kalman filter 312. MHT 302 then calculates hypotheses 304 and tracks 306, as described above. The various Kalman filters 308-312 receive measurement inputs from measurement processing 314 and dynamical model 316. The various Kalman filters 308-312 output state estimates for each track.

Figure 4:
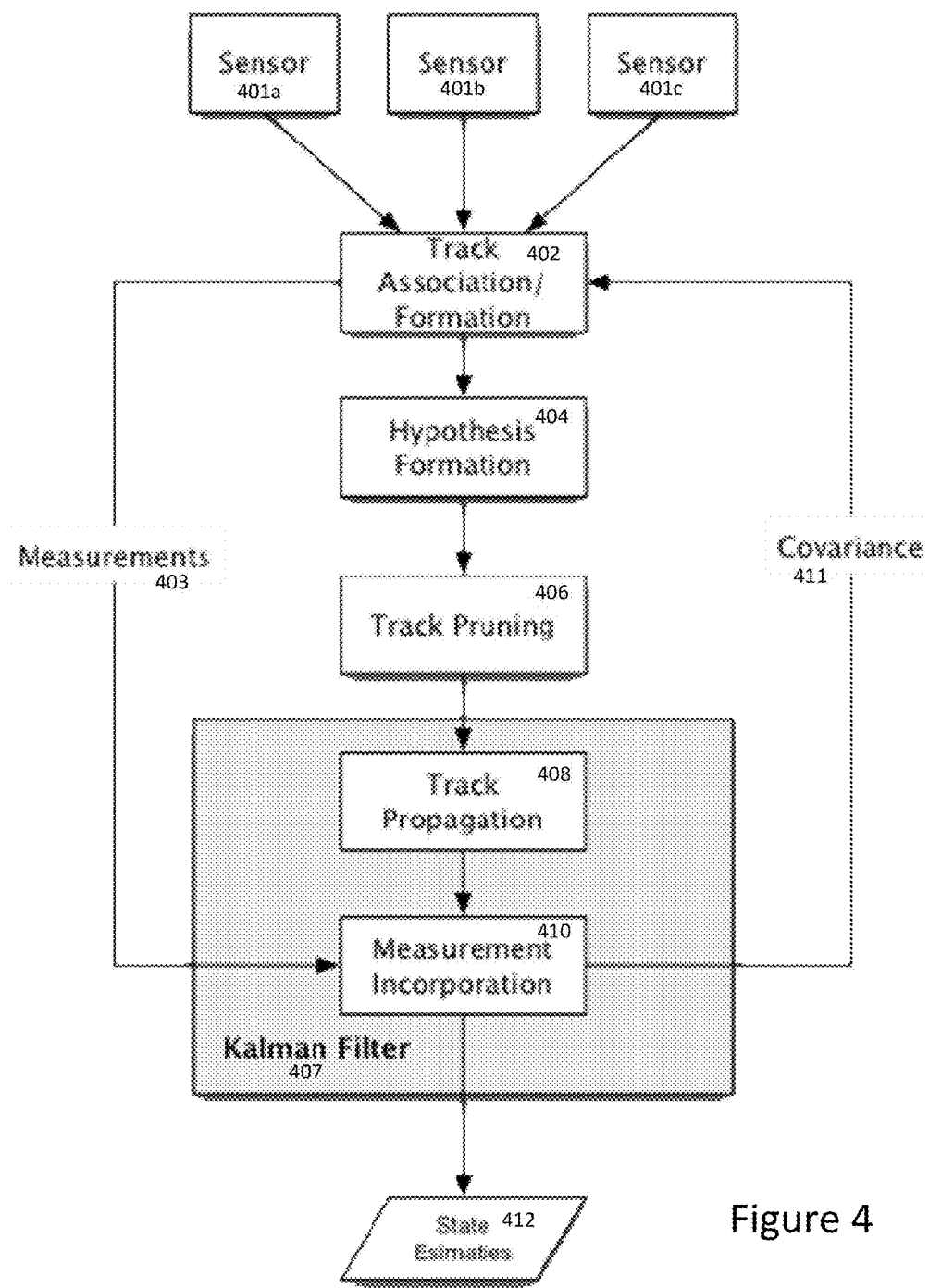
FIG. 4 shows a flow chart.

A flow chart is shown in FIG. 4. Multiple sensors 401a, 401b, and 401c generate measurements. Each sensor may generate multiple measurements. An object can only have one measurement per sensor. All measurements create a new track or are associated with an existing track 402. The covariances are used to determine if a measurement should be associated with an existing track or multiple existing tracks.

Hypotheses are formed 404 as described above. Hypotheses are pruned 408. Ideally only one hypothesis remains. Tracks that are not part of a retained hypothesis are removed. Tracks are propagated 408. Measurements 403 are incorporated 410. Updated covariances 411 are made available. Estimated states are output 412.

In the foregoing description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

During the course of the above description like numbers have been used to identify like elements according to the different views, which illustrate the invention.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A system for tracking a plurality of moving vehicles that reduces a number of computations required, the system comprising:
a plurality of sensors that form a plurality of scans by measuring positions of the plurality of moving vehicles over a plurality of time intervals, wherein each of the plurality of scans is a collection of measurements from the plurality of sensors taken in a particular time interval;
a processor that is communicatively coupled to the plurality of sensors; wherein the processor:
receives, from the plurality of sensors, a first collection of measurements of a first scan measured during a first time interval, wherein each measurement of the first collection of measurements is a single measurement from one of the plurality of sensors,
generates a first group of tracks using a dynamic state transition model, wherein the first group of tracks includes a track for each of the first collection of measurements;
forms a first hypothesis for the first group of tracks, wherein the first hypothesis is a set of compatible tracks, and two or more tracks are compatible if each track describes a different target and do not share an identical measurement from any of the plurality of scans;
removes one or more particular tracks from the first group of tracks that are not included in the first hypothesis to form a first pruned group by assigning a score to each track group;
predicts using a Kalman filter, expected positions of each of the plurality of moving vehicles based on the first pruned group;
updates the dynamic state transition model to form an updated dynamic transition model based on the first pruned group,
receives, from the plurality of sensors, a second collection of measurements from a second scan during a second time interval,
forms a second hypothesis, based on the updated dynamic transition model and a plurality of covariances calculated for each of the second collection of measurements, and
tracks the plurality of moving vehicles based on the second hypothesis.

2. The system of claim 1, wherein the plurality of sensors includes a camera.

3. The system of claim 1, wherein the plurality of sensors includes a radar device.

4. The system of claim 1, wherein the plurality of sensors includes a range finder.

5. The system of claim 1, wherein the plurality of sensors is an acoustic range finder.

6. The system of claim 1, wherein the Kalman filter is an unscented Kalman filter.

7. The system of claim 1, wherein the Kalman filter is any combination of a Kalman filter, an unscented Kalman filter, and an extended Kalman filter.

8. A method for tracking a plurality of moving vehicles that reduces a required number of computations, the method comprising:
receiving, from a plurality of sensors, a first collection of measurements of a first scan measured during a first time interval, wherein the plurality of sensors form a plurality of scans by measuring positions of the plurality of moving vehicles over a plurality of time intervals, wherein each of the plurality of scans is a collection of measurements from the plurality of sensors taken in a particular time interval;

generating a first group of tracks for each of the first plurality of measurements using a dynamic state transition model, wherein the first group of tracks includes a track for each of the first collection of measurements;

forming a first hypothesis for the first group of tracks, wherein the first hypothesis is a set of compatible tracks, and two or more tracks are compatible if each track describes a different target and do not share an identical measurement from any of the plurality of scans;

removing one or more particular tracks from the first group of tracks that are not included in the first hypothesis to form a first pruned group by assigning a score to each track;

predicting, using a Kalman filter, expected positions of each of the plurality of moving vehicles based on the first pruned group;

updating the dynamic state transition model to form an updated dynamic transition model based on the first pruned group;

receiving, from the plurality of sensors, a second collection of measurements from a second scan during a second time interval;

forming a second hypothesis based on the updated dynamic transition model and a plurality of covariances calculated for each of the second collection plurality of measurements; and tracking the plurality of moving vehicles based on the second hypothesis.

9. The method of claim 8, wherein the second hypothesis is formed by appending one of the second collection of measurements to an existing track in the first pruned group by generating a new track that includes at least one of the first collection of measurements associated with the existing track on a condition that the one of the second collection of measurements describes an object described by the existing track.

10. The method of claim 8, wherein the second hypothesis is formed by generating a new track, independent of all of first collection of measurements, using one of the second collection of measurements on a condition that the one of the second collection of measurements does not describe an object described by any existing track in the first hypothesis.

* * * * *